United States Patent
Clark (10) Patent No.: US 12,444,967 B2
(45) Date of Patent: Oct. 14, 2025

(54) SMART GENERATOR

(71) Applicant: Alarm.com Incorporated, Tysons, VA (US)

(72) Inventor: Colby Kevin Clark, Provo, UT (US)

(73) Assignee: Alarm.com Incorporated, Tysons, VA (US)

( * ) Notice: Subject to any disclaimer, the term of this patent is extended or adjusted under 35 U.S.C. 154(b) by 1015 days.

(21) Appl. No.: 17/519,004

(22) Filed: Nov. 4, 2021

(65) Prior Publication Data

US 2022/0140639 A1 May 5, 2022

Related U.S. Application Data (60) Provisional application No. 63/110,166, filed on Nov. 5, 2020.

(51) Int. Cl.
*H02J 7/00* (2006.01)
*F02D 19/06* (2006.01)
*F02D 29/06* (2006.01)

(52) U.S. Cl.
CPC .... *H02J 7/007188* (2020.01); *F02D 19/0615* (2013.01); *F02D 29/06* (2013.01); *H02J 7/0048* (2020.01); *H02J 7/00712* (2020.01); *F02D 2200/025* (2013.01)

(58) Field of Classification Search
CPC ............ F02D 19/0615; F02D 2200/025; H02J 7/0048; H02J 7/00712; H02J 2300/10
USPC ............................................ 290/30 R, 31, 46
See application file for complete search history.

(56) References Cited

U.S. PATENT DOCUMENTS

| | | | | |
|---|---|---|---|---|
| 4,965,552 A | * | 10/1990 | Price | G08B 13/1672 340/573.2 |
| 5,561,330 A | * | 10/1996 | Crook | H02P 9/08 290/31 |
| 6,166,525 A | * | 12/2000 | Crook | H02P 9/08 322/11 |
| 6,947,830 B1 | * | 9/2005 | Froloff | F02D 41/3076 701/111 |
| 7,365,443 B2 | * | 4/2008 | Gendron | H02P 11/00 290/31 |
| 11,772,807 B2 | * | 10/2023 | Kuang | H02P 5/46 290/31 |
| 2007/0285270 A1 | * | 12/2007 | Gunn | H02J 7/34 340/693.6 |
| 2010/0201328 A1 | * | 8/2010 | Monsive, Jr. | H02J 7/1415 320/162 |

(Continued)

FOREIGN PATENT DOCUMENTS

CN 110352947 B * 8/2022 ............ A01M 29/18

*Primary Examiner* — Charles Reid, Jr.
(74) *Attorney, Agent, or Firm* — Fish & Richardson P.C.

(57) ABSTRACT

Techniques and systems are described for power generation management. A described technique includes receiving, by a controller, a request to activate a power generator, wherein the power generator is fuel-based; receiving, by the controller, one or more sensor inputs from one or more sensors situated at or nearby the power generator; using, by the controller, the one or more sensor inputs to detect human activity around the power generator; and controlling, by the controller, an activation of the power generator in response to the request based on whether human activity is detected around the power generator.

18 Claims, 6 Drawing Sheets

(56) References Cited

U.S. PATENT DOCUMENTS

| | | | |
|---|---|---|---|
| 2014/0245995 A1* | 9/2014 | Deliyski | F02D 19/0613 123/456 |
| 2015/0316944 A1* | 11/2015 | Thellend | G05B 15/02 700/292 |
| 2019/0257262 A1* | 8/2019 | Yoon | G01N 33/2829 |
| 2021/0071596 A1* | 3/2021 | Atterberry | F02D 19/0607 |

* cited by examiner

SMART GENERATOR

CROSS REFERENCE TO RELATED APPLICATION

This disclosure claims the benefit of the priority of U.S. Provisional Application Ser. No. 63/110,166, entitled "SMART GENERATOR" and filed Nov. 5, 2020, which is incorporated herein by reference in its entirety.

TECHNICAL FIELD

This disclosure relates to power generation management technology.

BACKGROUND

Various types of fuel-based power generators can convert fuel such as gasoline, propane, or natural gas into electricity. A power generator can provide a backup or alternate solution to dwellings or businesses that are connected to a utility managed power grid. A power generator can be a primary power source for dwellings or businesses that are off-grid such as those located in rural or isolated areas. A power generator can be coupled with other power sources such as solar system, battery system, or both.

SUMMARY

A power generator can be equipped with a controller to optimize generator performance and behavior. For example, the controller can selectively deactivate or reduce power generation if people are detected around the generator to minimize or eliminate noise-based nuisances or hazards such as exhaust fumes. Human activity can be detected via video, audio, or both. The controller can determine energy usage profiles to determine low-energy-use or no-energy-use periods and shutdown the generator during those periods. An alternate power source such as a battery system or a solar system can provide energy while the generator is shutdown, e.g., not actively producing energy. In some implementations, the controller can determine if a high-load device needs to be used, such as a dryer that may overload an alternate energy source, based on a request from the device or a user input, and the request can cause the generator to activate. In some implementations, the controller can be communicatively coupled with a smart home controller to determine energy usage profiles and to remotely activate the generator.

A power generator, in some implementations, can be fueled by multiple fuel sources and a fuel selector can be used to select a fuel source. Different fuel sources can have different properties and costs. Examples of properties include fuel efficiency and noise-outputs. The generator's controller can take various measurements including fuel consumption, load demand, sound levels, ambient temperature, and humidity. Other types of measurements are possible. The controller can determine a fuel type to use based on these measurements and user profiles. For example, the controller can cause a fuel source that has a quieter-generator-noise-output property to be used during the night. In some implementations, the controller can detect a change in ambient temperature. Upon detection of the change, the controller can cause the power generator to use a fuel source that is more efficient in the detected ambient temperature.

A described technique for power generator management includes receiving, by a controller, a request to activate a power generator such as a fuel-based generator. In some implementations, a web-based application can generate the request and send the request to the controller. In some implementations, a user input received via a control panel can trigger generation of the request. In some implementations, a smart appliance can generate the request before increasing its power consumption. The technique includes receiving, by the controller, one or more sensor inputs from one or more sensors such as audio, video, or motion detection sensors that are situated at or nearby the power generator. The technique includes using, by the controller, the one or more sensor inputs to detect human activity around the power generator. The technique further includes controlling, by the controller, an activation of the power generator in response to the request based on whether human activity is detected around the power generator. For example, generator activation can be delayed or its output modified, e.g., modify power output as to reduce noise, fumes, or both, when human activity is detected. Other implementations include corresponding systems, apparatus, and computer programs to perform the actions of methods defined by instructions encoded on computer readable storage.

These and other implementations can include one or more of the following features. Implementations can include determining a battery level of a battery. The battery and the power generator can collectively provide energy to one or more devices. Controlling the activation of the power generator can include determining whether the battery level is in a critical range based on a critical level threshold. Controlling the activation of the power generator can include sending a command to commence the activation when human activity is detected around the power generator and the battery level is in the critical range. Controlling the activation of the power generator can include reducing a power generation output of the power generator when human activity is detected around the power generator and the battery level is not in the critical range. Controlling the activation of the power generator can include disregarding a detection of human activity when the battery level is in the critical range.

In some implementations, controlling the activation of the power generator can include sending a command to commence the activation when human activity is detected around the power generator. Sending the command can include issuing an audio warning, visual warning, or both to alert humans that the power generator is about to start. In some implementations, one or more sensor inputs can include a video stream coming from an imaging sensor situated at or nearby the generator. Using the one or more sensor inputs can include using the video stream as input to a human tracking routine to determine that people have entered a predetermined perimeter defined around the power generator. Controlling the activation of the power generator can include delaying the activation when human activity is detected around the power generator. Using the one or more sensor inputs to detect human activity can include determining whether a human is within a predetermined perimeter defined around the power generator.

The power generator can include a fuel selector to select among different fuel types. Implementations can include monitoring noise outputs of the power generator over time to cover different periods of time when different fuel types are used; generating fuel type profiles based on the noise outputs; and causing, when human activity is detected around the power generator, the fuel selector to select a fuel tank corresponding to a fuel type that is associated with reduced noise emissions.

Particular configurations of the technology described in this disclosure can be implemented so as to realize one or more of the following potential advantages. One or more of the described techniques and systems can modify generator operations to increase user or bystander comfort by reducing generator noise emissions through intelligent monitoring and people-based detection. One or more of the described techniques and systems can improve fuel efficiency of electrical generators. One or more of the described techniques and systems can intelligently select a fuel source for a multi-fuel power generator based on environmental factors that minimizes the cost of fuel. The generator can be selectively activated to reduce stress on a battery source or to prevent an overload situation when a high-load device such as a washer, a dryer, or heating ventilation and air conditioning (HVAC) is powered on to its high energy consumption state.

The details of one or more implementations are set forth in the accompanying drawings and the description below. Other features will be apparent from the description and drawings.

DETAILED DESCRIPTION

Figure 1:
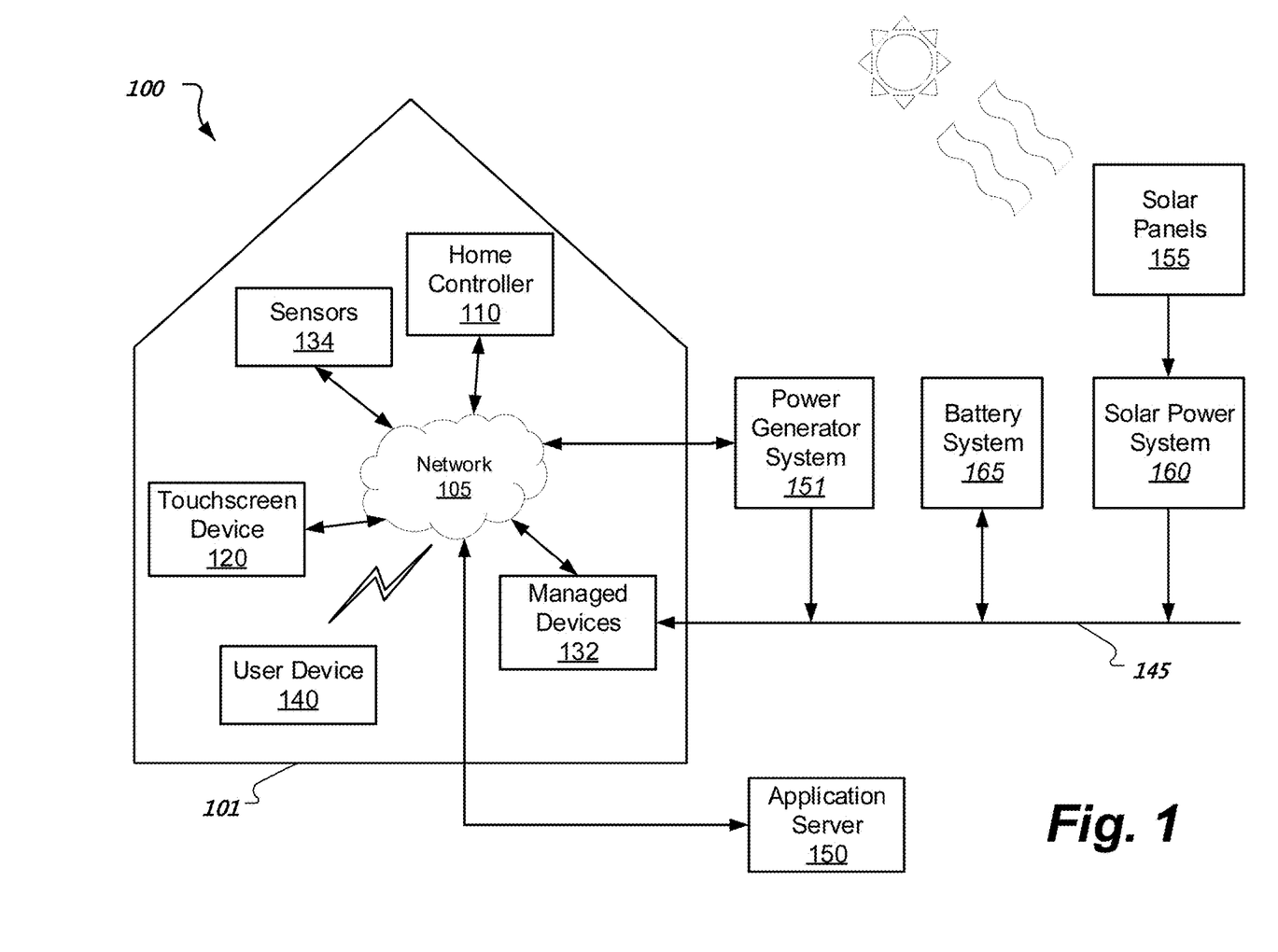
FIG. 1 shows an example of a system that provides energy management of various managed devices and a fuel-based power generator.

FIG. 1 shows an example of a system 100 that provides energy management of various managed devices 132 and a fuel-based power generator system 151. The system 100 can include a home controller 110, a touchscreen device 120, managed devices 132, sensors 134, a user device 140, and an application server 150 connected via a network 105. In some implementations, the home controller 110 can be referred to as a smart home controller. Various components of the system 100 can be located in and associated with a property 101 such as a home or an office. In some implementations, a user can control the system 100 via the touchscreen device 120, a user device 140, or both. In some implementations, the user device 140, such as a smartphone, can be used to control the system 100 from a remote location.

The system 100 includes an electrical bus 145 that distributes power to the property 101 including, among other things, the managed devices 132. The electrical bus 145 can be coupled with the power generator system 151, battery system 165, and solar power system 160, which includes one or more solar panels 155. The home controller 110 can cause the battery system 165 to provide energy if the power generator system 151 is shutdown, solar generation is not sufficient, or both. In some implementations, the home controller 110 can cause a switchover to the main grid-based power lines, which can be coupled to the bus 145 via switch circuitry, when there is a generator, solar, or battery energy deficit.

The power generator system 151 can be activated based on one or more factors. Controllers associated with high-load devices can be configured to request activation of the power generator system 151. Various examples of high-load devices include dryer, oven, heater, electric vehicle charger, HVAC, and water pump. Other types of devices are possible. In some implementations, a low-load device or group of low-load devices can trigger an activation of the power generator system 151. The home controller 110 can receive an activation request and determine whether to activate the power generator system 151 based on a determination that additional energy generation is required. In some implementations, the home controller 110 can cause the power generator system 151 to go from partial capacity to full capacity to support a high-load device. In some implementations, one or more functional aspects of the home controller 110 described herein can be implemented within a generator controller of the power generator system 151.

In some implementations, the home controller 110 can activate the power generator system 151 to recharge one or more batteries within the battery system 165 via the electrical bus 145. For example, if the battery system 165 falls to a nominal threshold, the home controller 110 can activate the power generator system 151 to recharge the battery system 165 until a predetermined battery charge level has been satisfied. A presence detector, in some implementations, can determine that people are nearby and suppress generator activation until the battery system 165 falls to a lower, critical threshold.

In some implementations, the home controller 110 can activate the power generator system 151 to produce noises to scare off wildlife or intruders. In some implementations, the home controller 110 can detect wildlife approaching a perimeter around the house, and can activate the power generator system 151 to power an electric fence. In some implementations, the home controller 110 can activate the power generator system 151 based on a time-of-use rate change, e.g., active at 3 PM because utility rates are higher between 3 and 9 PM. In some implementations, the home controller 110 can communicate with a utility company supplying grid-based power and allow the utility company to remotely active the power generator system 151. An application server 150 can facilitate communications between the home controller 110 and a utility company, e.g., automate retrieval of utility rate pricing.

The solar power system 160 can transfer energy from the solar panels 155 to the managed devices 132 and the battery system 165 via the electrical bus 145. The solar power system 160 can include sensors to measure solar power generation. For example, if the solar power system 160 is observed to be producing less electricity than projected for a given sunny day, the home controller 110 can send a notification to a user to investigate. For example, a dust storm or rainstorm can coat the panels 155 with mud which causes a lower power output, which can be resolved by the user cleaning the panels 155.

The network 105 can be configured to provide communications among connected devices. For example, the network 105 can be configured to enable exchange of electronic communications between the home controller 110, the touchscreen device 120, the managed devices 132, the sensors 134, the user device 140, and the application server 150. The network 105 can include, for example, one or more wireline segments, one or more wireless segments, or both.

In some implementations, the network 105 includes a wireless access point and a broadband Internet device.

The home controller 110 can be configured to control various aspects of the system 100 including security, automation, energy management, or a combination thereof. In some implementations, the home controller 110 includes circuitry such as a network module and a processor configured to execute instructions of a program that controls operation of the system 100. The home controller 110 can be configured to receive input from sensors 134, the solar power system 160, touchscreen device 120, and user device 140. The home controller 110 can use the received input to control the managed devices 132 via network 105.

The sensors 134 can include one or more of a contact sensor, a motion sensor, a glass break sensor, an occupancy sensor, or any other type of sensor that can be included in an alarm or security system. The sensors 134 can also include an environmental sensor, such as a temperature sensor, a water sensor, a rain sensor, a wind sensor, a light sensor, a smoke detector, a carbon monoxide detector, an air quality sensor, etc. In some implementations, the sensors 134 can include one or more cameras. The cameras can be video/photographic cameras or other type of optical sensing devices configured to capture images. For instance, the cameras can be configured to capture images of an area within a building monitored by the home controller 110. The cameras can be configured to capture single, static images of the area and also video images of the area in which multiple images of the area are captured at a relatively high frequency (e.g., thirty images per second). The cameras can be controlled based on commands received from the touchscreen device 120 or user device 140. In some implementations, the home controller 110 can use a camera based sensor to detect people in a room.

Various examples of managed devices 132 include connected televisions, kitchen appliances, washer, dryer, car charger, controllable light sources, safety and security devices, water features, and HVAC systems. Other types of managed devices are possible. For example, a managed device 132 can include a smart control unit that controls an ordinary light source such as a lamp. In some implementations, one or more of the managed devices 132 can periodically transmit information such as usage or status information to the home controller 110. In some implementations, one or more of the managed devices 132 can be controlled via the touchscreen device 120, the user device 140, or both. In some implementations, the home controller 110 can control the managed devices 132 based on information received from the touchscreen device 120, user device 140, and the sensors 134. In some implementations, the home controller 110 can control the managed devices 132 based on scene configuration records, a predetermined scheduled, or both. In some implementations, the touchscreen device 120 can enable or disable one or more of the managed devices 132 via the home controller 110 based on received sensor data from the sensors 134. In some implementations, a scene can be automatically triggered based on one or more energy management criteria such as a rule based on a change in fuel-based power generation, solar power generation, stored power availability, or both. The home controller 110 can control the managed devices 132 based on the triggered scene. In some implementations, a scene can include to prohibit the power generator system 151 to activate when people are detected in a bedroom or when a window adjacent to the power generator system 151 is open as to prevent exhaust fumes from entering.

The user device 140, such as a smartphone or a laptop, can receive data associated with the system 100 through the network 105. The user device 140 can receive the data from the home controller 110 through the network 105. In some implementations, the application server 150 can relay data received from the home controller 110 to the user device 140 through the network 105 or a different network. In this regard, the application server 150 can facilitate communications between the user device 140 and the home controller 110.

The user device 140 can include a system access application. For example, the user device 140 can load or install the system access application based on data received over a network 105 or data received from local media. In some implementations, the system access application of the user device 140 identifies a geographic location associated with the user device 140 and communicates information identifying the geographic location to the application server 150. The home controller 110 can detect whether a user is presently located inside or outside the property 101.

The application server 150 can be a remote monitoring station for a service provider such as an internet service provider, an alarm security provider, or an internet security provider that receives data transmissions such as, for example, internet activity, Wi-Fi presence, internet connectivity, and monitoring system information. The application server 150 can track connection events to the network 105 transmitted from devices located within the property 101. For example, the application server 150 can be configured to exchange communications with a local installation client connected to the network 105 that generates the activity reports and transmits the activity reports to the application server 150. The application server 150 can also collect data about the power generator system 151 such as fuel consumption, detailed break-down of fuel usage by fuel type and time of day.

The application server 150 can be configured to transmit cloud-based configuration settings to the home controller 110 to adjust the operations of the home controller 110. For example, a user can create scenes via a website hosted by the application server 150. The scenes can be used to control the managed devices 132 based on whether the power generator system 151 or solar power system 160 is reporting a power surplus or deficit. In some implementations, a user can select a scene via a touchscreen device 120 or a user device 140. In some implementations, the application server 150 can provide information such as weather patterns such that the home controller 110 can predict solar power generation. In some implementations, the application server 150 can provide information such as weather patterns such that the home controller 110 can generate proactive notifications to refuel the power generator system 151 before a severe storm hits.

In some implementations, the system 100 can include additional or different power generators such as hydroelectric or wind. In some implementations, if a power generator such as hydroelectric, wind, or solar is not satisfying a configurable threshold level, a controller can send an alert. In some implementations, the threshold level can be static or based on a wind speed sensor reading such that if a power output for a wind-based generator does not correspond to detected wind speeds, the alert can indicate the discrepancy (which may be indicative of a broken or malfunctioning turbine).

Figure 2:
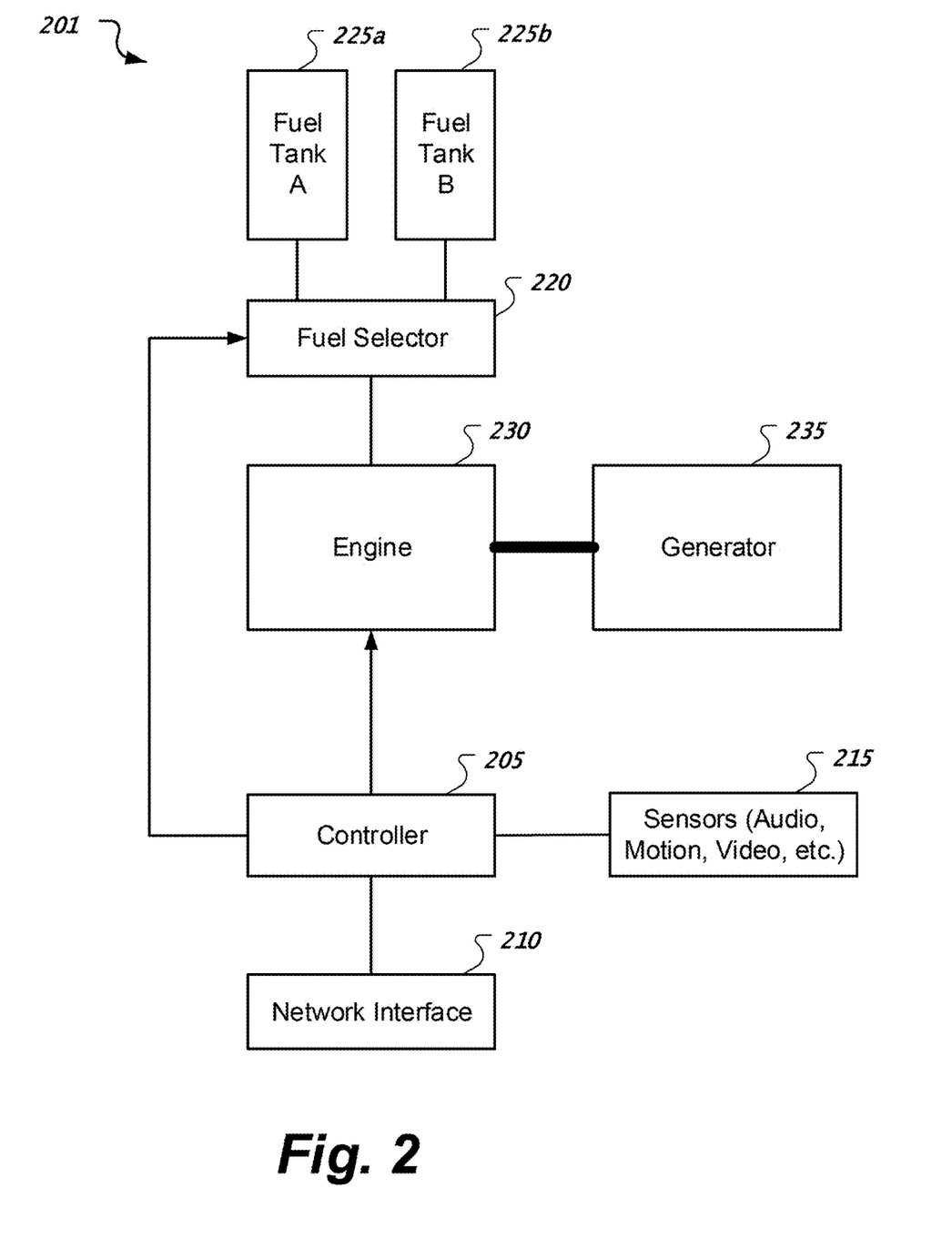
FIG. 2 shows a diagram of an example of a smart generator system.

FIG. 2 shows a diagram of an example of a smart generator system 201. The generator system 201 can be a standalone generator in terms of control functionality, or it can be coupled with a controller of a smart home such as the ones described herein. The smart generator system 201 includes a controller 205, network interface 210, one or more sensors 215, an engine 230, and a generator 235. The generator system 201 can use one or more types of fuel such as gasoline, liquid propane gas, or natural gas. Other types of fuel are possible. As such, the system 201 further includes fuel tanks 225a, 225b that are coupled with a fuel selector 220, which provides a selected fuel to the engine 230. In this example, the engine 230 is a multi-fuel source engine which is able to use two or more different types of fuel. In some implementations, the engine 230 is a combustion engine or a turbine engine. In some implementations, the system 201 includes different engines that are fueled by different fuel types, e.g., there is a gasoline-powered engine and propane-powered engine. The engine 230 can be mechanically coupled with the generator 235 such that the generator 235 can convert the mechanical energy output of the engine 230 into electricity.

The controller 205 can make decisions about whether to start, stop, or throttle the engine 230 based on inputs from one or more sensors 215 or the network interface 210. Various examples of the sensors 215 include an audio sensor such as a microphone, motion sensor, or video sensor. Other types of sensors are possible. In some implementations, the sensors 215 include a carbon monoxide (CO) sensor, fuel leak sensor, or both. The CO sensor can be placed adjacent to the engine 230 or within a home or other building. If a detected CO concentration level exceeds a predetermined threshold, the controller 205 can take action by stopping the engine 230, generating an alert notification, or both. In some implementations, the controller 205 can control other devices such as an exhaust fan or an external generator cooling system.

In some implementations, the generator system 201 can include a sensor to measure the fuel consumed and the power output. The generator system 201 can determine engine efficiency based on fuel consumption and power output. In some implementations, a fuel consumption meter can be included between the fuel selector 220 and the engine 230, or between a fuel tank 225a-b and the fuel selector 220. In some implementations, the fuel consumption meter can be located in the fuel selector 220 or in the engine 230. In some implementations, a sensor 215 such as a microphone is used to monitor noise output of the generator system 201. The generator system 201 can take sound measurements (e.g., in dBm) and associate the measurements with various inputs such as a fuel type being used by the engine 230 or a load being placed on the system 201. These sound measurements can change the operations of the system 201. For example, if fuel A runs quieter than fuel B, then the system 201 can create a rule to use fuel A at night. If fuel B produces more power per unit in the cold (e.g., less than 40 degrees), then the system 201 can be configured to create a rule to use fuel B when it is cold.

The controller 205 can provide notifications and reports such as a maintenance reminder, fuel tank access notification (which can be used to check whether the fuel tank was refueled or to guard against fuel theft), whether more power than usual was generated for the day, unexpected spike in generator activation, fuel type change (e.g., change in selector settings of the fuel selector 220), fuel exhaustion, etc. For example, if all fuel is about to be exhausted (e.g., tank(s) is less than 10% full), then the controller 205 can send an alert before shutdown. In another example, if fuel tank A 225a is exhausted and the controller 205 has caused the fuel selector 220 to switch over to fuel tank B 225b which contains the more expensive fuel, a notification can be sent to the user. In some implementations, if the fuel has reached the end of its shelf life (e.g., it is about to expire), a notification can be sent to rotate that fuel supply and/or the controller can favor use of that fuel until it is exhausted instead of using other (possibly cheaper) sources of fuel.

In some implementations, the controller 205 can send an alert based on an extreme weather forecast. For example, a fuel-low alert threshold can be increased if a severe snowstorm is forecasted (e.g., an alert is sent when the tank is less than 40% full instead of nominal weather threshold of 10%). As such, the controller 205 can receive weather forecasts via network interface 210. In some implementations, the controller 205 periodically sends fuel information to a monitoring service which in turns makes a decision to send an alert.

Figure 3:
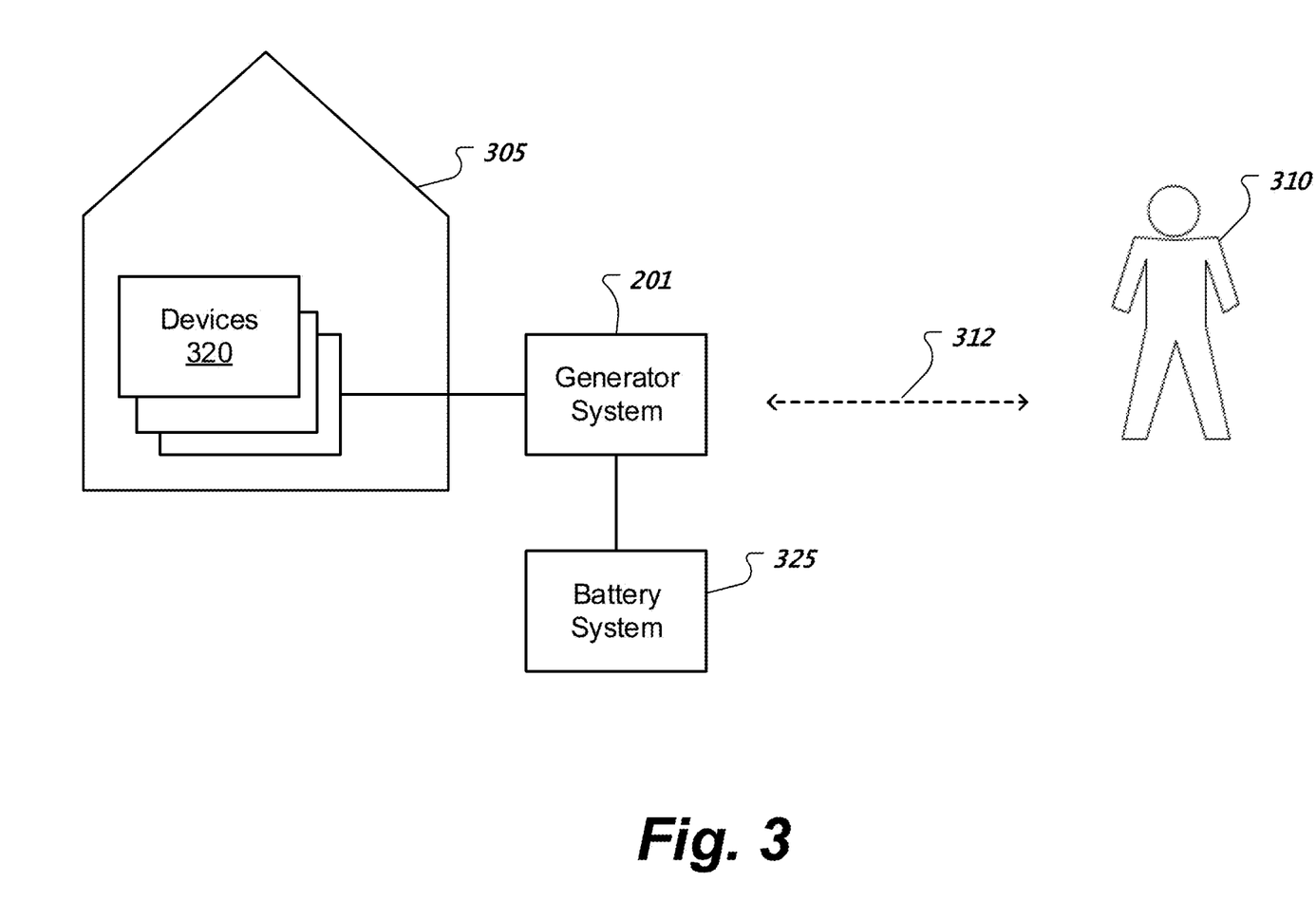
FIG. 3 shows an example of an environment that includes the generator system of FIG. 2.

FIG. 3 shows an example of an environment that includes the generator system 201 of FIG. 2. The generator system 201 can provide power to devices 320 within or around a house 305 for example. A battery system 325 can store energy for later use. The house 305 can be located in a rural or isolated area where a connection to a power grid is not possible or practical. The house 305 can be connected to a power grid, but due to high energy costs, the home owner may prefer to only use the power grid as a last resort.

The generator system 201 can detect that a person 310 is within a predetermined distance 312 of the generator system 201 and modify generator behavior if the person 310 has been detected. For example, if the charge level of the battery system 325 falls below a "desired" threshold, the generator system 201 can activate the engine 230. However, a sensor 215, such as a video sensor, microphone, or motion detector, can be used to determine that there is human activity in the area of the generator system 201. Given the human activity, the generator system 201 is not activated until the human activity has moved elsewhere, or the charge level of the battery system 325 falls below a "critical" threshold. In some implementations, the generator system 201 can generate a warning signal, e.g., audio, visual, or both, to alert the person 310 before the generator system 201 activates.

In some implementations, a sensor 215 can be used to determine the approach of hazardous wildlife. The generator system 201 can activate based on the approach of wildlife in order to power a protective electric fence until the hazardous wildlife moves away from the area. In some implementations, the generator system 201 can include a keypad for password input and require a user to input a password before enabling the generator system 201 to activate.

In some cases, the devices 320 can be all powered-off or at a low-power state at some point during the day or night. In some implementations, the generator system 201 can determine a typical idle period (e.g., between 1 PM and 4 PM) when the engine 230 is idling and adjust the schedule of the generator to not run during those hours in order to preserve fuel. In some implementations, a smart home controller (e.g., home controller 110) can be used to monitor devices 320 and generate a usage profile and adjust the schedule of the generator system 201 to avoid prolonged idle periods to preserve fuel. The battery system 325 can provide power should a device be powered-on while the engine 230 of the generator system 201 is shutdown. A high-load device of the devices 320 can be equipped with a controller to send a request to the generator system 201 to start the engine 230 before the high-load aspect of the device is activated. For example, a user can turn-on a smart dryer to enter the desired drying program. The smart dryer can send the request, and wait for an activation confirmation before energizing its high-load dryer circuitry. In some implementations, a smart home controller can send the request based on a user indicating an intention to start the dryer.

Figure 4:
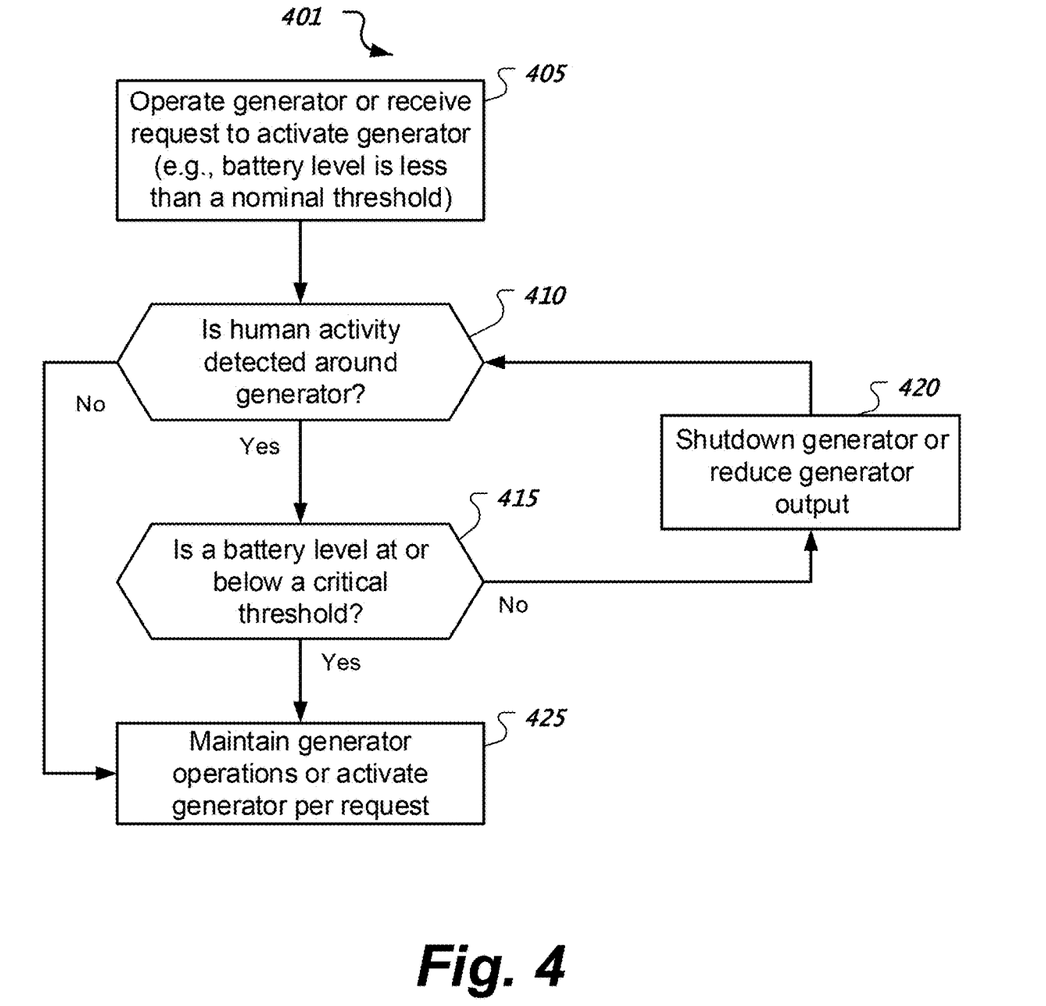
FIG. 4 shows a flowchart of an example of a process performed by a controller of a fuel-based power generator.

FIG. 4 shows a flowchart of an example of a process 401 performed by a controller of a fuel-based power generator. At 405, the controller operates the generator or receives a request to activate the generator. An activation request may be generated by a managed device, home controller, a user input, or the generator's controller. For example, if the generator is shutdown, the generator's controller can detect if a battery level of a battery system is less than a nominal threshold, and if so, the controller can issue its own request to activate the generator.

At 410, the controller determines whether human activity is detected around the generator. Human activity detection can include analyzing outputs from a video camera, microphone, or both. Various examples of human activity include a human standing, walking, running, jumping, or being seated. Other types of activities are possible. In some implementations, a motion detector is used as a primary detector, and the controller uses video or audio inputs to confirm the presence of humans (e.g., facial recognition, human sound recognition, etc.). In some implementations, the controller can use a video stream coming from an imaging sensor situated at or nearby the generator as input to a human tracking routine to determine that people have entered a predetermined perimeter defined around the generator. In some implementations, the predetermined perimeter is defined by a set radius centered on the generator. Other perimeters are possible such as a rectangle. In some implementations, a perimeter can be defined by a sensor's field of view. Further, the perimeter can be dynamic, e.g., the perimeter can define a larger zone around the generator at night and a smaller zone during the day. The controller can be configured to distinguish between transient human activities (e.g., a human walking through an area defined by the perimeter) and non-transient human activities (e.g., a child playing with within the perimeter for greater than a predetermined amount of time). In some implementations, non-transient human activities can trigger the detection at 410, whereas transient human activities would not trigger the detection at 410. In some implementations, trajectory analysis can be used to distinguish between transient and non-transient activities. For example, trajectory analysis can be used to determine whether a human is walking through an area defined by the generator's perimeter or is stationary within the area. In some implementations, a timer can be used to distinguish between transient and non-transient activities. For example, an initial detection of a human within the perimeter can start a timer for a predetermined amount (e.g., 30 seconds, 1 minute, 5 minutes etc.), and at the end of the timer, i.e., timer expiration, if the human continues to be detected, then human activity is deemed detected at 410. In some implementations, the controller can determine a quantity of humans that have entered a predetermined perimeter defined around the generator and can use a threshold quantity when detecting human activity (e.g., no human activity is deemed detected at 410 if the detected quantity of humans is less than three). In some implementations, audio-based thresholds can be dynamic, e.g., a lower threshold during the day and a higher threshold at night. In some implementations, the thresholds can be stored in a databased, configured by a user, or configured by default parameters. If no human activity is detected, the controller maintains the generator operations as-is or activates the generator per the request at 425.

If human activity is detected, then at 415, the controller determines whether a battery level is at or below a critical threshold. If the battery level is at or below the critical threshold, the controller, at 425, maintains the generator operations as-is (if already operating at 405) or activates the generator (if a request was received). For example, detected human activity can be disregarded when the battery level is critical. In some implementations, the controller may notify the user about the battery level, human activity, or both and provide a mechanism such as a user interface to allow the user to activate the generator despite the human activity. In some implementations, the controller can determine whether the battery level is in a critical range based on a critical level threshold. Determining whether the battery level is in a critical range can include determining whether the battery level is at or below a critical level threshold. In some implementations, the critical level threshold is a predetermined percentage based on the energy storage capacity of the battery (e.g., 10%, 25%, etc.), where the predetermined percentage can be configurable. If the generator will be activated with humans around, the controller may issue an audio warning, visual warning, or both to alert humans that the generator is about to start. In some implementations, if a high-load device sends a request to activate the generator while the battery level is at or below the critical threshold and human activity is detected, the controller may cause the high-load device to delay its high-load operations. For example, a smart dishwasher can be placed in a wait state until the generator is able to activate.

If the battery level is above the critical threshold, the controller can shutdown the generator or reduce generator output at 420. After a predetermined period of time the controller can check for human activity again at 410. If the activity has ceased, the controller can activate the generator at 425. Activating the generator can include sending a command to commence the activation. In some implementations, the command is sent via control signaling or a data packet. The controller can determine whether an activity has ceased based on a lack of detection of humans for a predetermined period of time. In some implementations, the controller can use a video stream and human tracking routine to determine that people have walked away from the generator.

Figure 5:
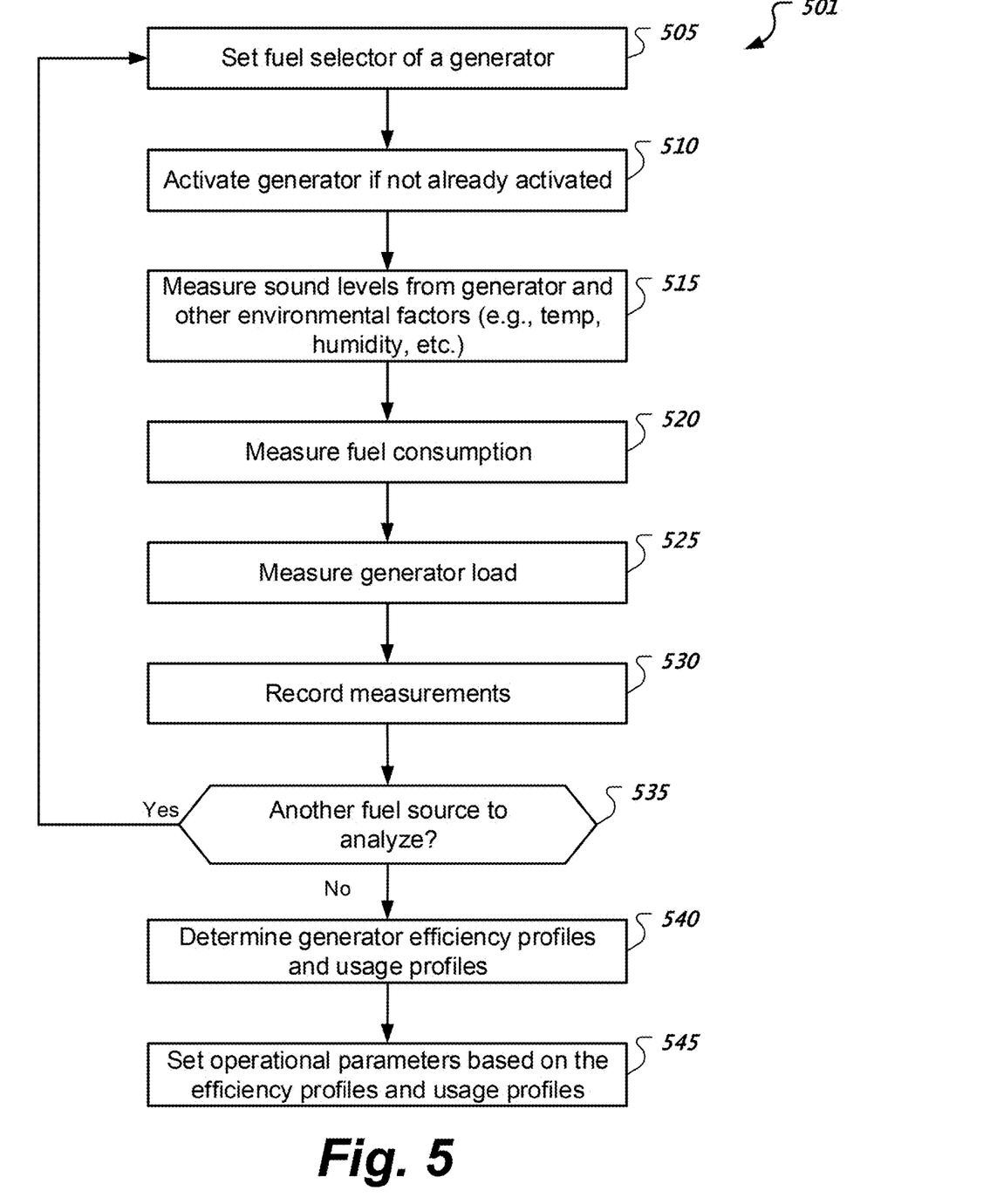
FIG. 5 shows a flowchart of an example of a process performed by a controller that performs generator-related measurements and optimizes generator operations based on those measurements.

FIG. 5 shows a flowchart of an example of a process 501 performed by a controller that performs generator-related measurements and optimizes generator operations based on those measurements. At 505, the controller sets the fuel selector of a generator. In some implementations, the controller sets the fuel selector to a predetermined fuel source (e.g., fuel tank A 225*a*). At 510, the controller activates the generator if not already activated. At 515, the controller measures sound levels from generator and other environmental factors (e.g., temp, humidity, etc.). For example, the controller can take sound level measurements from a microphone. At 520, the controller can measure fuel consumption. At 525, the controller measures generator load. At 530, the controller records the measurements. In some implementations, measurements can be recorded into a database after a measurement has been taken. In some implementations, any of these measurements can be taken periodically during a measurement window. In some implementations, the controller can record all measurements. In some implementations, the controller can compute statistics such as an average for each type of measurement. At 535, the controller determines whether there is another fuel source to analyze. If there is another fuel source, the controller continues at 505 and causes the fuel selector to select the next fuel source before proceeding with the next round of measurements and recording 515-530.

If all fuel sources have been analyzed, then at 540, the controller determines generator efficiency profiles and usage profiles. At 545, the controller sets operational parameters based on the efficiency profiles and usage profiles. In some implementations, the controller can create a sound-based usage profile. The controller can detect an increase in generator noise output and correlate the increase with an activation of a particular managed device. For example, when appliance "A" activates, the controller can record the observation that the generator runs 50% louder than normal. Further, the controller can use microphone measurements to analyze generator noise outputs under given loads using various fuel types during various outdoor conditions. The controller can monitor fuel consumed and power produced. The controller can determine that when ambient temperatures are below a threshold temperature and humidity is above a threshold humidity, fuel type A produces more watts-per-unit. Based on this, the controller can create a rule to use fuel A when temperatures are below the threshold temperature and humidity is above the threshold humidity. The controller can also, for example, determine that the generator operates 20% quieter for 90% of the loads when using fuel B. The controller can create a rule to use fuel B during nighttime hours.

In some implementations, the controller can create an energy usage profile to determine one or more periods of the day that have the lowest energy usage, and if the combined energy usage can be satisfied by battery or solar, then the controller can create a rule to shutdown the generator system during periods that typically have the lowest energy usage.

In some implementations, the controller can retrieve current pricing information for the available fuel types to update fuel price data, and can make decisions based on the fuel price data. In some implementations, the controller can determine that one or more managed devices have delayable start times. The controller can orchestrate the delayable devices such that their high-load run-times are non-overlapping to minimize or prevent overload situations. For example, if the HVAC is currently running, the controller can delay the start of the dryer until the HVAC is off or at least returns to a standby mode.

Figure 6:
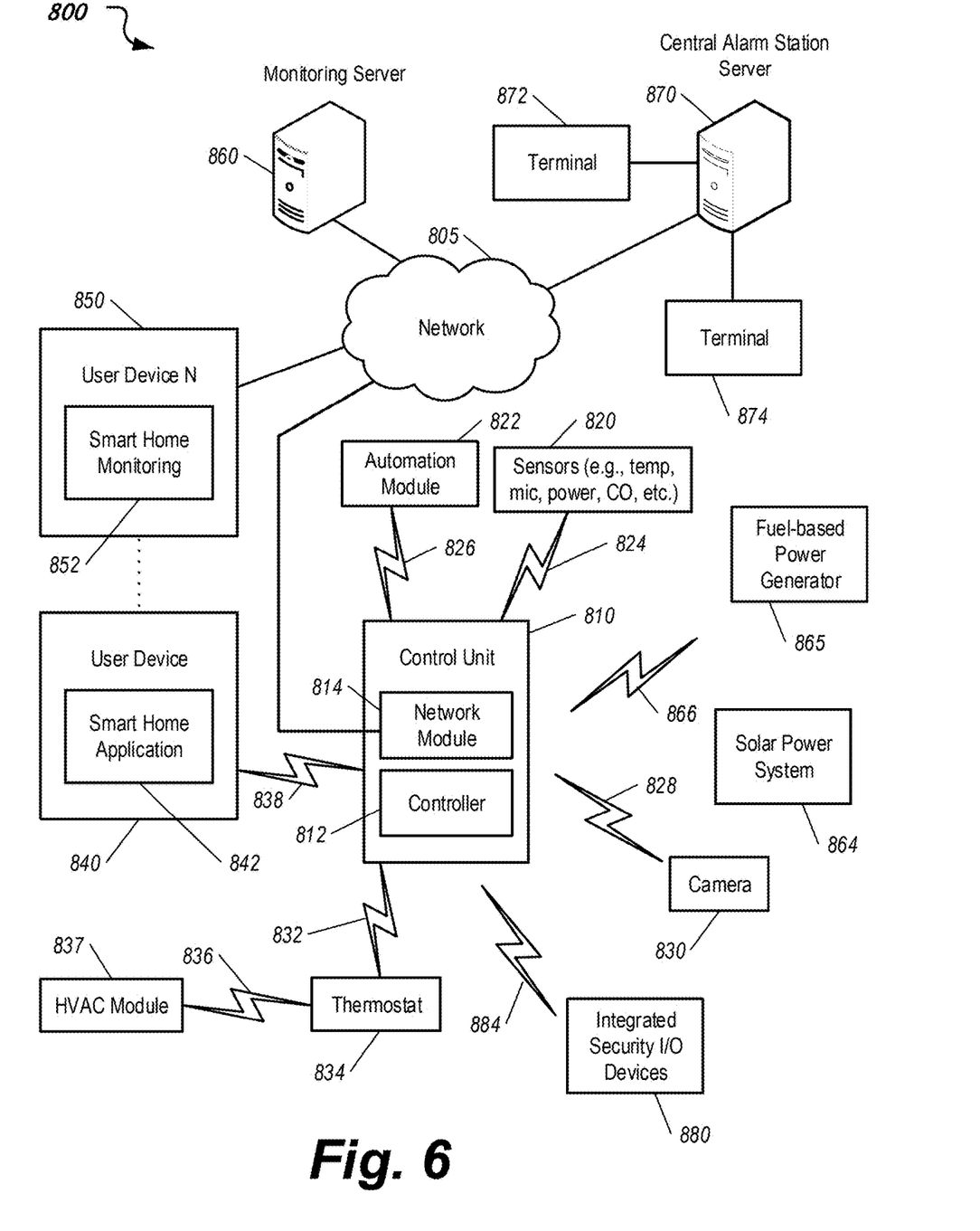
FIG. 6 shows a block diagram of an example of a monitoring system that includes a fuel-based power generator.

FIG. 6 shows a block diagram of an example of a monitoring system 800 that includes a fuel-based power generator 865. The monitoring system 800 includes a network 805, a control unit 810, one or more user devices 840 and 850, a monitoring server 860, and a central alarm station server 870. In some examples, the network 805 facilitates communications between the control unit 810, the one or more user devices 840 and 850, the monitoring server 860, and the central alarm station server 870.

The network 805 is configured to enable exchange of electronic communications between devices connected to the network 805. For example, the network 805 may be configured to enable exchange of electronic communications between the control unit 810, the one or more user devices 840 and 850, the monitoring server 860, and the central alarm station server 870. The network 805 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 may include multiple networks or subnetworks, each of which may include, for example, a wired or wireless data pathway. The network 805 may include a circuit-switched network, a packet-switched data network, or any other network able to carry electronic communications (e.g., data or voice communications). For example, the network 805 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 805 may include one or more networks that include wireless data channels and wireless voice channels. The network 805 may be a wireless network, a broadband network, or a combination of networks including a wireless network and a broadband network.

The control unit 810 includes a controller 812 and a network module 814. The controller 812 is configured to control a control unit monitoring system (e.g., a control unit system) that includes the control unit 810. In some examples, the controller 812 may include a processor or other control circuitry configured to execute instructions of a program that controls operation of a control unit system. In these examples, the controller 812 may be configured to receive input from sensors, flow meters, or other devices included in the control unit system and control operations of devices included in the household (e.g., speakers, lights, doors, etc.). For example, the controller 812 may be configured to control operation of the network module 814 included in the control unit 810.

The network module 814 is a communication device configured to exchange communications over the network 805. The network module 814 may be a wireless communication module configured to exchange wireless communications over the network 805. For example, the network module 814 may be a wireless communication device configured to exchange communications over a wireless data channel and a wireless voice channel. In this example, the network module 814 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 814 also may be a wired communication module configured to exchange communications over the network 805 using a wired connection. For instance, the network module 814 may be a modem, a network interface card, or another type of network interface device. The network module 814 may be an Ethernet network card configured to enable the control unit 810 to communicate over a local area network and/or the Internet. The network module 814 also may be a voice band modem configured to enable the alarm panel to communicate over the telephone lines of Plain Old Telephone Systems (POTS).

The control unit system that includes the control unit 810 includes one or more sensors. For example, the monitoring system may include multiple sensors 820. The sensors 820 may include a lock sensor, a contact sensor, a motion sensor, or any other type of sensor included in a control unit system. The sensors 820 also may include an environmental sensor, such as a temperature sensor, a water sensor, a rain sensor, a wind sensor, a light sensor, a smoke detector, a carbon monoxide detector, an air quality sensor, and microphone etc. The sensors 820 further may include a power consumption meter. In some implementations, a sensor 820 can be coupled with one or more devices such as HVAC components 837 to measure their power consumption.

In some implementations, the control unit 810 communicates with an automation module 822 and the camera 830 to perform monitoring. The automation module 822 is connected to one or more devices that enable home automation control. For instance, the automation module 822 may be connected to one or more lighting systems and may be configured to control operation of the one or more lighting systems. Also, the automation module 822 may be connected to one or more electronic locks at the property and may be configured to control operation of the one or more electronic locks (e.g., control Z-Wave locks using wireless communications in the Z-Wave protocol. Further, the automation module 822 may be connected to one or more appliances at the property and may be configured to control operation of the one or more appliances. The automation module 822 may include multiple modules that are each specific to the type of device being controlled in an automated manner. The automation module 822 may control the one or more devices based on commands received from the control unit 810. For instance, the automation module 822 may cause a lighting system to illuminate an area to provide a better image of the area when captured by a camera 830.

The camera 830 may be a video/photographic camera or other type of optical sensing device configured to capture images. For instance, the camera 830 may be configured to capture images of an area within a building or within a residential facility monitored by the control unit 810. The camera 830 may be configured to capture single, static images of the area and also video images of the area in which multiple images of the area are captured at a relatively high frequency (e.g., thirty images per second). The camera 830 may be controlled based on commands received from the control unit 810.

The camera 830 may be triggered by several different types of techniques. For instance, a Passive Infra-Red (PIR) motion sensor may be built into the camera 830 and used to trigger the camera 830 to capture one or more images when motion is detected. The camera 830 also may include a microwave motion sensor built into the camera and used to trigger the camera 830 to capture one or more images when motion is detected. The camera 830 may have a "normally open" or "normally closed" digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra-Red, Z-wave controlled "white" lights, lights controlled by the automation module 822, etc.) to improve image quality when the scene is dark. An integrated or separate light sensor may be used to determine if illumination is desired and may result in increased image quality.

The camera 830 may be programmed with any combination of time/day schedules, system "arming state", or other variables to determine whether images should be captured or not when triggers occur. The camera 830 may enter a low-power mode when not capturing images. In this case, the camera 830 may wake periodically to check for inbound messages from the controller 812. The camera 830 may be powered by internal, replaceable batteries if located remotely from the control unit 810. The camera 830 may employ a small solar cell to recharge the battery when light is available. Alternatively, the camera 830 may be powered by the controller's 812 power supply if the camera 830 is co-located with the controller 812.

The system 800 also includes thermostat 834 to perform dynamic environmental control at the property. The thermostat 834 is configured to monitor temperature and/or energy consumption of an HVAC system associated with the thermostat 834, and is further configured to provide control of environmental (e.g., temperature) settings. In some implementations, the thermostat 834 can additionally or alternatively receive data relating to activity at a property and/or environmental data at a property, e.g., at various locations indoors and outdoors at the property. The thermostat 834 can directly measure energy consumption of the HVAC system associated with the thermostat, or can estimate energy consumption of the HVAC system associated with the thermostat 834, for example, based on detected usage of one or more components of the HVAC system associated with the thermostat 834. The thermostat 834 can communicate temperature and/or energy monitoring information to or from the control unit 810 and can control the environmental (e.g., temperature) settings based on commands received from the control unit 810.

In some implementations, the thermostat 834 is a dynamically programmable thermostat and can be integrated with the control unit 810. For example, the dynamically programmable thermostat 834 can include the control unit 810, e.g., as an internal component to the dynamically programmable thermostat 834. In addition, the control unit 810 can be a gateway device that communicates with the dynamically programmable thermostat 834.

A HVAC module 837 can coupled with one or more HVAC components, such as a furnace or a A/C, associated with a property. The HVAC module 837 can be configured to control operation of the one or more components of the HVAC system. In some implementations, the HVAC module 837 is also configured to monitor energy consumption of the HVAC system components, for example, by directly measuring the energy consumption of the HVAC system components or by estimating the energy usage of the one or more HVAC system components based on detecting usage of components of the HVAC system. The HVAC module 837 can communicate energy monitoring information and the state of the HVAC system components to the thermostat 834 via link 836 and can control the one or more components of the HVAC system based on commands received from the thermostat 834 via link 836.

The system 800 further includes one or more integrated security devices 880. The one or more integrated security devices may include any type of device used to provide alerts based on received sensor data. For instance, the one or more control units 810 may provide one or more alerts to the one or more integrated security input/output devices. Additionally, the one or more control units 810 may receive one or more sensor data from the sensors 820 and determine whether to provide an alert to the one or more integrated security devices 880.

The sensors 820, the automation module 822, the camera 830, the thermostat 834, and the integrated security devices 880 communicate with the controller 812 over communication links 824, 826, 828, 832, and 884. The communication links 824, 826, 828, 832, and 884 may be a wired or wireless data pathway configured to transmit signals from the sensors 820, the automation module 822, the camera 830, the thermostat 834, and the integrated security devices 880 to the controller 812. The sensors 820, the automation module 822, the camera 830, the thermostat 834, and the integrated security devices 880 may continuously transmit sensed values to the controller 812, periodically transmit sensed values to the controller 812, or transmit sensed values to the controller 812 in response to a change in a sensed value.

The communication links 824, 826, 828, 832, and 884 may include a local network. The sensors 820, the automation module 822, the camera 830, the thermostat 834, and the integrated security devices 880, and the controller 812 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 8 (CAT8) or Category 8 (CAT6) wired Ethernet network. The local network may be a mesh network constructed based on the devices connected to the mesh network.

The monitoring server 860 is an electronic device configured to provide monitoring services by exchanging electronic communications with the control unit 810, the one or more user devices 840 and 850, and the central alarm station server 870 over the network 805. For example, the monitoring server 860 may be configured to monitor events (e.g., alarm events) generated by the control unit 810. In this example, the monitoring server 860 may exchange electronic communications with the network module 814 included in the control unit 810 to receive information regarding events (e.g., alerts) detected by the central alarm station server 870. The monitoring server 860 also may receive information regarding events (e.g., alerts) from the one or more user devices 840 and 850.

In some examples, the monitoring server 860 may route alert data received from the network module 814 or the one or more user devices 840 and 850 to the central alarm station server 870. For example, the monitoring server 860 may transmit the alert data to the central alarm station server 870 over the network 805.

The monitoring server 860 may store sensor and image data received from the monitoring system and perform analysis of sensor and image data received from the monitoring system. Based on the analysis, the monitoring server 860 may communicate with and control aspects of the control unit 810 or the one or more user devices 840 and 850.

The central alarm station server 870 is an electronic device configured to provide alarm monitoring service by exchanging communications with the control unit 810, the one or more user devices 840 and 850, and the monitoring server 860 over the network 805. For example, the central alarm station server 870 may be configured to monitor alerting events generated by the control unit 810. In this example, the central alarm station server 870 may exchange communications with the network module 814 included in the control unit 810 to receive information regarding alerting events detected by the control unit 810. The central alarm station server 870 also may receive information regarding alerting events from the one or more user devices 840 and 850 and/or the monitoring server 860.

The central alarm station server 870 is connected to multiple terminals 872 and 874. The terminals 872 and 874 may be used by operators to process alerting events. For example, the central alarm station server 870 may route alerting data to the terminals 872 and 874 to enable an operator to process the alerting data. The terminals 872 and 874 may include general-purpose computers (e.g., desktop personal computers, workstations, or laptop computers) that are configured to receive alerting data from a server in the central alarm station server 870 and render a display of information based on the alerting data. For instance, the controller 812 may control the network module 814 to transmit, to the central alarm station server 870, alerting data indicating that a sensor 820 detected motion from a motion sensor via the sensors 820. The central alarm station server 870 may receive the alerting data and route the alerting data to the terminal 872 for processing by an operator associated with the terminal 872. The terminal 872 may render a display to the operator that includes information associated with the alerting event (e.g., the lock sensor data, the motion sensor data, the contact sensor data, etc.) and the operator may handle the alerting event based on the displayed information.

In some implementations, the terminals 872 and 874 may be mobile devices or devices designed for a specific function. Although FIG. 6 illustrates two terminals for brevity, actual implementations may include more (and, perhaps, many more) terminals. The one or more user devices 840 and 850 are devices that host and display user interfaces. For instance, the user device 840 is a mobile device that hosts one or more native applications (e.g., the smart home application 842). The user device 840 may be a cellular phone or a non-cellular locally networked device with a display. The user device 840 may include a cell phone, a smart phone, a tablet PC, a personal digital assistant ("PDA"), or any other portable device configured to communicate over a network and display information. The user device 840 may perform functions unrelated to the monitoring system, such as placing personal telephone calls, playing music, playing video, displaying pictures, browsing the Internet, maintaining an electronic calendar, etc.

The user device 840 includes a smart home application 842. The smart home application 842 refers to a software/firmware program running on the corresponding mobile device that enables the user interface and features described throughout. The user device 840 may load or install the smart home application 842 based on data received over a network or data received from local media. The smart home application 842 runs on mobile devices platforms, such as iPhone, iPod touch, Blackberry, Google Android, Windows Mobile, etc. The smart home application 842 enables the user device 840 to receive and process image and sensor data from the monitoring system 800.

The user device 850 may be a general-purpose computer (e.g., a desktop personal computer, a workstation, or a laptop computer) that is configured to communicate with the monitoring server 860 and/or the control unit 810 over the network 805. The user device 850 may be configured to display a smart home user interface 852 that is generated by the user device 850 or generated by the monitoring server 860. For example, the user device 850 may be configured to display a user interface (e.g., a web page) provided by the monitoring server 860 that enables a user to perceive images captured by the camera 830 and/or reports related to the monitoring system. Although FIG. 6 illustrates two user devices for brevity, actual implementations may include more (and, perhaps, many more) or fewer user devices.

In some implementations, the one or more user devices 840 and 850 communicate with and receive monitoring system data from the control unit 810 using the communication link 838. For instance, the one or more user devices 840 and 850 may communicate with the control unit 810 using various local wireless protocols such as Wi-Fi, Bluetooth, Zwave, ZigBee, HomePlug (Ethernet over powerline), or wired protocols such as Ethernet and USB, to connect the one or more user devices 840 and 850 to local security and automation equipment. The one or more user devices 840 and 850 may connect locally to the monitoring system and its sensors and other devices. The local connection may improve the speed of status and control communications because communicating through the network 805 with a remote server (e.g., the monitoring server 860) may be significantly slower.

Although the one or more user devices 840 and 850 are shown as communicating with the control unit 810, the one or more user devices 840 and 850 may communicate directly with the sensors 820 and other devices controlled by the control unit 810. In some implementations, the one or more user devices 840 and 850 replace the control unit 810 and perform the functions of the control unit 810 for local monitoring and long range/offsite communication.

In other implementations, the one or more user devices 840 and 850 receive monitoring system data captured by the control unit 810 through the network 805. The one or more user devices 840, 850 may receive the data from the control unit 810 through the network 805 or the monitoring server 860 may relay data received from the control unit 810 to the one or more user devices 840 and 850 through the network 805. In this regard, the monitoring server 860 may facilitate communication between the one or more user devices 840 and 850 and the monitoring system.

In some implementations, the one or more user devices 840 and 850 may be configured to switch whether the one or more user devices 840 and 850 communicate with the control unit 810 directly (e.g., through link 838) or through the monitoring server 860 (e.g., through network 805) based on a location of the one or more user devices 840 and 850. For instance, when the one or more user devices 840 and 850 are located close to the control unit 810 and in range to communicate directly with the control unit 810, the one or more user devices 840 and 850 use direct communication. When the one or more user devices 840 and 850 are located far from the control unit 810 and not in range to communicate directly with the control unit 810, the one or more user devices 840 and 850 use communication through the monitoring server 860.

In some implementations, the one or more user devices 840 and 850 are used in conjunction with only local sensors and/or local devices in a house. In these implementations, the system 800 only includes the one or more user devices 840 and 850, the sensors 820, the automation module 822, and the camera 830. The one or more user devices 840 and 850 receive data directly from the sensors 820, the automation module 822, and the camera 830, and send data directly to the sensors 820, the automation module 822, and the camera 830. The one or more user devices 840, 850 provide the appropriate interfaces/processing to provide visual surveillance and reporting. In some implementations, the system 800 provides end users with access to images captured by the camera 830 to aid in decision making. The system 800 may transmit the images captured by the camera 830 over a wireless WAN network to the user devices 840 and 850.

In some implementations, a state of the monitoring system 800 and other events sensed by the monitoring system may be used to enable/disable video/image recording devices (e.g., the camera 830). In these implementations, the camera 830 may be set to capture images on a periodic basis when the alarm system is armed in an "Away" state, but set not to capture images when the alarm system is armed in a "Stay" state or disarmed. In addition, the camera 830 may be triggered to begin capturing images when the alarm system detects an event, such as an alarm event, a door-opening event for a door that leads to an area within a field of view of the camera 830, or motion in the area within the field of view of the camera 830. In other implementations, the camera 830 may capture images continuously, but the captured images may be stored or transmitted over a network when needed.

The controller 812 can communicate via a communication link 866 with power sources such as a fuel-based power generator 865, a solar power system 864, and a battery system. In some implementations, the battery system is included as part of a fuel-based power generator 865 or a solar power system 864. In some implementations, the controller can detect human activity via the camera 830 or one or more other sensors 820. In some implementations, the controller uses a sensor 820 such as a microphone to monitor the fuel-based power generator 865.

In some implementations, the controller 812 can collect power generation measurements from the fuel-based power generator 865 and the solar power system 864 via the communication link 866. In some implementations, the controller 812 can collect power consumption measurements from one or more sensors 820 via the communication link 824. In some implementations, the smart home application 842 can be configured to display power generation and consumption measurements. In some implementations, the smart home application 842 can be configured to display a power status, e.g., surplus or deficit.

In some implementations, the controller 812 can communicate with the thermostat 834 to modify a temperature set-point of the HVAC module 837 to either increase power consumption or decrease power consumption of the HVAC components. In some implementations, the controller 812 can communicate with the automation module 822 to power on or power off devices such as lighting to increase or decrease power consumption. In some implementations, the controller 812 can collect data from sources such as sensors 820 and/or camera 830 to determine whether a room is occupied, and control the automation module 822 to power off one or more devices in the room when the room is not occupied.

In some implementations, critical aspects of the monitoring system 800 can be assigned a critical energy utilization priority indicator such that the integrity of the monitoring system 800 is maintained through a power deficit to provide continued safety of the residents and security of the property. For example, devices such as a control unit 810, one or more sensors 820, or camera 830 can be assigned a critical energy utilization priority indicator such that they remain fully operational all of the time. Moreover, life-support medical devices can also be assigned a critical energy utilization priority indicator such that the devices remain powered on at all times.

In some implementations, energy utilization priorities of the devices may change based on an armed state of the monitoring system 800. If the monitoring system 800 is armed away, then one or more devices such as lighting devices or the HVAC components can be re-assigned to have a low energy utilization priority indicator. However, a lighting device that provides lighting for security reasons can maintain or can be re-assigned to have a high energy utilization priority indicator.

In some implementations, a non-transitory computer-readable storage medium can include at least one program for execution by at least one processor of a device such as a controller, the at least one program including instructions which, when executed by the at least one processor, cause the device to perform operations. The operations can include receiving, by a controller, a request to activate a power generator; receiving, by the controller, one or more sensor inputs from one or more sensors situated at or nearby the power generator; using, by the controller, the one or more sensor inputs to detect human activity around the power generator; and controlling, by the controller, an activation of the power generator in response to the request based on whether human activity is detected around the power generator.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
receiving, by a controller, a request to activate a power generator;
determining a battery level of a battery, wherein the battery and the power generator collectively provide energy to one or more devices;
maintaining, by the controller, sensor data that was captured by one or more sensors physically located within a threshold distance of the power generator;
in response to receiving the request to activate the power generator, determining, by the controller and using the sensor data, whether human activity is detected within an area that includes the power generator; and
in response to determining that human activity is detected within the area that includes the power generator:
controlling, by the controller, an activation of the power generator, the controlling comprising sending a command to commence the activation of the power generator;
determining whether the battery level is in a critical range based on a critical level threshold; and
after activating, reducing a power generation output of the power generator from a first non-zero output value to a second, lower non-zero output value when human activity is detected around the power generator and the battery level is not in the critical range.

2. The method of claim 1, the method comprising:
determining that the battery level is in the critical range based on the critical level threshold, wherein controlling the activation of the power generator comprises sending the command to commence the activation in response to determining that the battery level is in the critical range and determining that human activity is detected within the area that includes the power generator.

3. The method of claim 1, comprising:
determining that the battery level is in the critical range based on the critical level threshold, wherein:
controlling the activation of the power generator comprises disregarding a detection of human activity in response to determining that the battery level is in the critical range.

4. The method of claim 1, wherein one or more sensor inputs comprises a video stream coming from an imaging sensor situated at or nearby the power generator, and wherein using the one or more sensor inputs comprises using the video stream as input to a human tracking routine to determine that people have entered a predetermined perimeter defined around the power generator.

5. The method of claim 1, comprising:
receiving, from a device, a second request to activate the power generator to generate power for the device; and
in response to determining that human activity is detected within the area that includes the power generator, controlling, for the second request, the activation of the power generator, the controlling comprising:
determining to delay activation of the power generator; and
sending, to the device, a message that causes the device to delay power consumption.

6. The method of claim 1, comprising:
maintaining a plurality of fuel type profiles that were generated based on noise outputs of the power generator over time, each profile from the plurality of fuel type profiles for a corresponding different fuel type from a plurality of different fuel types; and
in response to determining that human activity is detected within the area that includes the power generator, sending, to a fuel selector included in the power generator, an instruction to cause the fuel selector to select, using the plurality of fuel type profiles, a fuel tank corresponding to a fuel type that is associated with reduced noise emissions compared to another, different fuel type from the plurality of different fuel types.

7. A system comprising:
a power generator; and
a controller comprising one or more computers and one or more storage devices on which are stored instructions that are operable, when executed by the one or more computers, to cause the one or more computers to perform operations comprising:
receiving, from a device, a request to activate the power generator to generate power for the device;
maintaining sensor data that was captured by one or more sensors physically located within a threshold distance of the power generator; and
in response to receiving the request to activate the power generator:
determining, using the sensor data, whether human activity is detected within an area that includes the power generator; and
in response to determining that human activity is detected within the area that includes the power generator, controlling, by the controller, control an activation of the power generator, the controlling comprising:
determining to delay activation of the power generator; and
sending, to the device, a message that causes the device to delay power consumption.

8. The system of claim 7, the instructions comprising:
determining, for a second request to activate the power generator, a battery level of a battery, wherein the battery and the power generator collectively provide energy to one or more devices;
determining, for the second request, whether the battery level is in a critical range based on a critical level threshold; and
controlling, for the second request, the activation of the power generator using a result of the determination whether the battery level is in the critical range.

9. The system of claim 8, the operations comprising:
determining, for the second request, that the battery level is in the critical range based on the critical level threshold, wherein controlling the activation of the power generator comprises, for the second request, sending a command to commence the activation in response to determining that the battery level is in the critical range.

10. The system of claim 8, wherein controlling the activation of the power generator comprises, for the second request, reducing a power generation output of the power generator from a first non-zero output value to a second, lower non-zero output value when human activity is detected around the power generator and the battery level is not in the critical range.

11. The system of claim 8, the operations comprising:
determining that the battery level is in the critical range based on the critical level threshold; and
determining, for the second request and using the sensor data, that human activity is detected within the area that includes the power generator, wherein:
controlling the activation of the power generator comprises disregarding a detection of human activity in response to determining that the battery level is in the critical range.

12. The system of claim 8, wherein controlling the activation of the power generator comprises sending a command to commence the activation when human activity is detected around the power generator,
the operations comprising, in response to receiving the second request and determining that human activity is detected within the area that includes the power generator, causing presentation of an audio warning, visual warning, or both to alert humans that the power generator is about to start.

13. The system of claim 8, comprising:
a fuel selector included in the power generator,
the operations comprising maintaining a plurality of fuel type profiles based on noise outputs of the power generator over time, each profile from the plurality of fuel type profiles for a corresponding different fuel type from a plurality of different fuel types; and
in response to determining that human activity is detected within the area that includes the power generator, sending, to the fuel selector, an instruction to cause the fuel selector to select, using the plurality of fuel type profiles, a fuel tank corresponding to a fuel type that is associated with reduced noise emissions compared to another, different fuel type from the plurality of different fuel types.

14. One or more non-transitory computer-readable storage media comprising at least one program for execution by at least one processor of a device, the at least one program including instructions which, when executed by the at least one processor, cause the device to perform operations comprising:
maintaining a plurality of fuel type profiles that were generated based on noise outputs of a power generator over time, each profile from the plurality of fuel type profiles for a corresponding different fuel type from a plurality of different fuel types;
receiving a request to activate the power generator;
maintaining sensor data that was captured by one or more sensors physically located within a threshold distance of the power generator;
in response to receiving the request to activate the power generator:
determining, using the sensor data, whether human activity is detected within an area that includes the power generator; and
in response to determining that human activity is detected within the area that includes the power generator, sending, to a fuel selector included in the power generator, an instruction to cause the fuel selector to select, using the plurality of fuel type profiles, a fuel tank corresponding to a fuel type that is associated with reduced noise emissions compared to another, different fuel type from the plurality of different fuel types.

15. The media of claim 14, the instructions comprising:
determining, for a second request to activate the power generator, a battery level of a battery, wherein the battery and the power generator collectively provide energy to one or more devices;
determining, for the second request, whether the battery level is in a critical range based on a critical level threshold; and
controlling, for the second request, the activation of the power generator using a result of the determination whether the battery level is in the critical range.

16. The media of claim 15, the operations comprising:
determining, for the second request, that the battery level is in the critical range based on the critical level threshold, wherein controlling the activation of the power generator comprises, for the second request, sending a command to commence the activation in response to determining that the battery level is in the critical range.

17. The media of claim 15, wherein controlling the activation of the power generator comprises, for the second request, reducing a power generation output of the power generator from a first non-zero output value to a second, lower non-zero output value when human activity is detected around the power generator and the battery level is not in the critical range.

18. The media of claim 14, the operations comprising:
receiving, from a device, a second request to activate the power generator to generate power for the device; and
in response to determining for the second request that human activity is detected within the area that includes the power generator:
determining to skip activating the power generator based on the second request; and
sending, to the device, a message that causes the device to delay power consumption.

* * * * *